March 25, 1930.　　　A. E. F. MOONE　　　1,751,836

REEL FOR ELECTRIC CONDUCTORS

Filed Oct. 28, 1924　　　3 Sheets-Sheet 1

INVENTOR.
ALBERT E. F. MOONE.
BY Albert C. Bell
ATTORNEY.

INVENTOR.
ALBERT E.F. MOONE.
BY Albert C. Bell
ATTORNEY.

INVENTOR.
ALBERT E. F. MOONE.
BY Albert C. Bell
ATTORNEY.

Patented Mar. 25, 1930

1,751,836

UNITED STATES PATENT OFFICE

ALBERT E. F. MOONE, OF CHICAGO, ILLINOIS

REEL FOR ELECTRIC CONDUCTORS

Application filed October 28, 1924. Serial No. 746,293.

My invention relates to an improved construction of reels for electric conductors of the class in which rotation of the reel actuates contact mechanism by which the circuit through the electric conductors is closed for the greater part of the rotation of the reel and opened when the conductors are nearly or wholly wound on the reel.

By my present invention I provide a casing, preferably of sheet metal for enclosing the reel and electric contact mechanism, and a shaft portion for the reel preferably of molded insulating material which is hollow to contain the devices employed for actuating the contact mechanism. The molded insulating material may if desired, extend sufficiently to form a part or all of the reel itself and in any event this material serves to insulate a movable member within the hollow shaft, which is rotary with the reel and shaft and movable relatively thereto to actuate the contact mechanism, the total amount of motion of said member being much greater than that required to actuate the contact, to permit the conductors carried by the reel to be unwound from the reel to any desired extent with the contact in its actuated condition. With devices of this kind it is desirable that a number of turns of the electric conductors shall be carried by the reel so that the electric device controlled by the conductors may be moved to a greater or less distance from the casing of the device as desired, and be operative in any said position and that when the reel is actuated to nearly or quite wind the conductors thereon, the contact is open thus opening the circuit through the conductors. The device controlled by the electric conductors may be a cigar lighter, an electric lamp or any electric device which it may be desired to operate at various distances from the casing enclosing the reel.

By my present invention I also provide an improved construction of spring adjusting mechanism for regulating the tension on the spring employed to wind the conductors on the reel when the electric device operated by current flow through the conductors is released.

Figure 2:
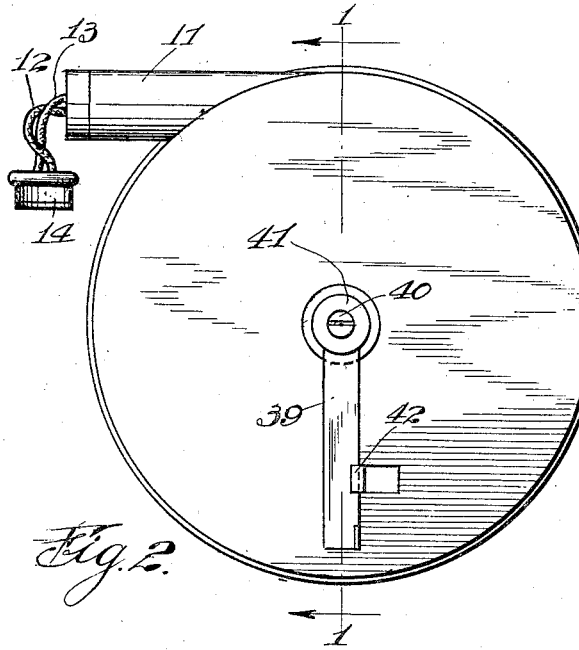
Figure 1:
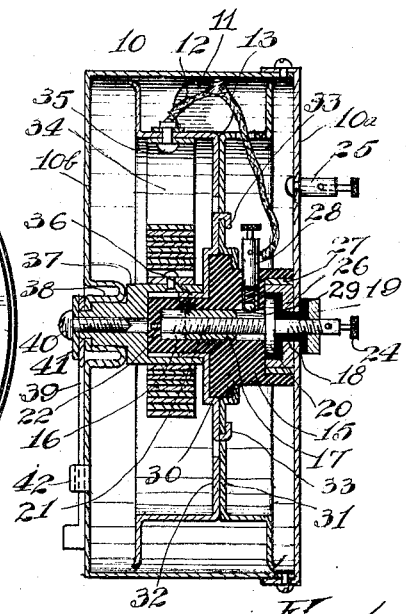
Figure 3:
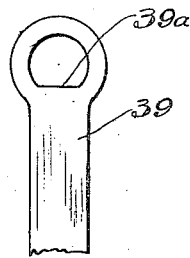
Figure 4:
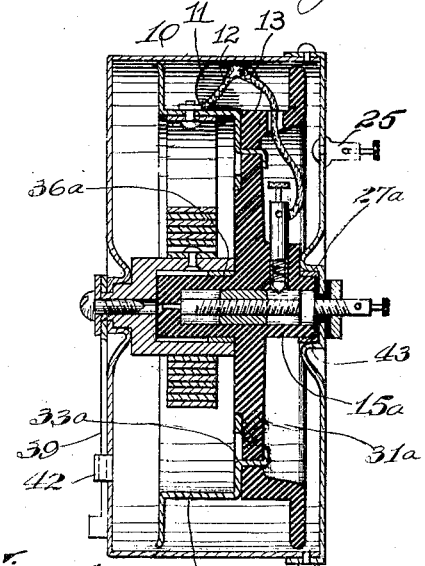
Figure 5:
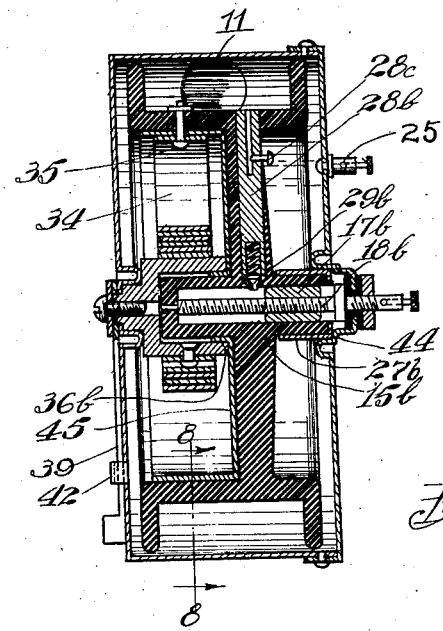
Figure 6:
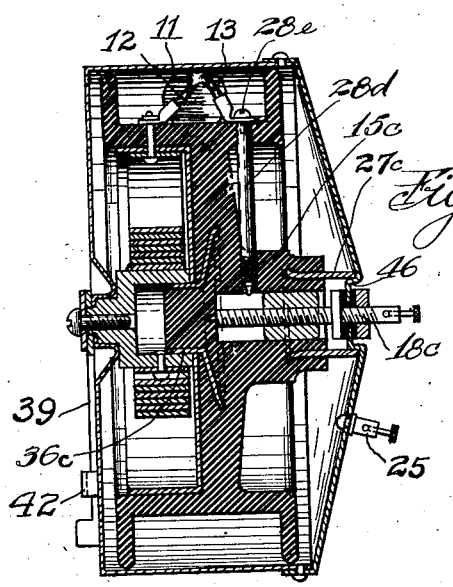
Figure 7:
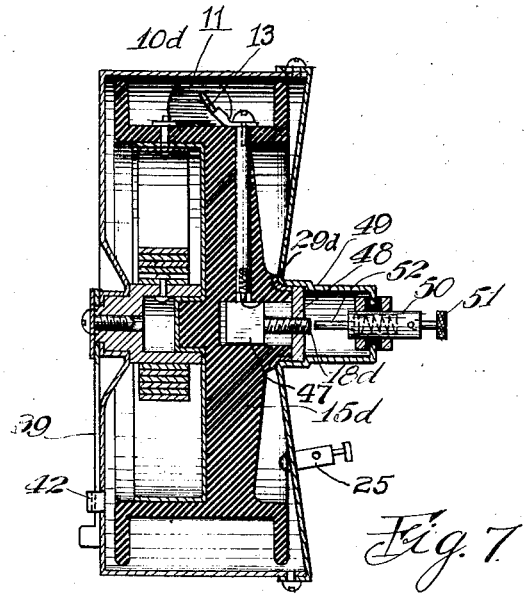
Figure 8:
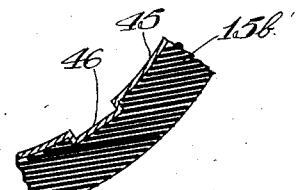
Figure 9:
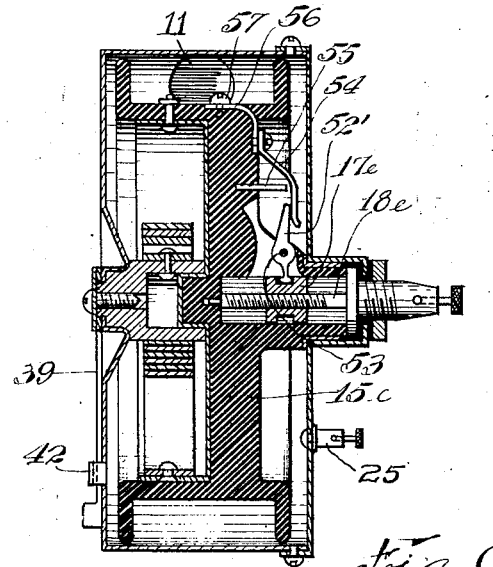
Figure 10:
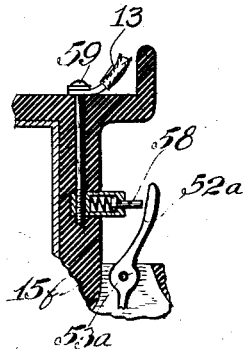

The above and other objects of my invention will be more completely understood by reference to the accompanying drawings showing preferred embodiments thereof in which Fig. 1 shows my device in vertical longitudinal sectional view, the reel in this construction consisting of sheet metal stampings, this view being taken along the line 1—1 in Fig. 2, Fig. 2 is a side elevation of the device shown in Fig. 1, Fig. 3 is a detail side view to an enlarged scale of a part of the lever employed to adjust the reel operating spring indicated in Fig. 1, Fig. 4 shows in a view similar to Fig. 1 a modified construction in which the insulating material of the shaft extends to form a part of the reel, Fig. 5 shows in a view similar to Fig. 1 a construction in which the insulating material of the shaft is extended to form the entire reel, Fig. 6 shows in a view similar to Fig. 1 a construction similar to that shown in Fig. 5, a different construction of bearing surfaces for the shaft being shown in this figure, Fig. 7 shows in a view similar to Fig. 1 a reel and shaft construction similar to that shown in Figs. 5 and 6, the difference being that a modified form of contact making mechanism is illustrated in this construction, Fig. 8 is a sectional view to an enlarged scale of the rim of the reel construction shown in Fig. 5 taken along the line 8—8, Fig. 9 shows in a view similar to Fig. 1 a construction similar to that shown in Figs. 5-7 inclusive, the difference being that a different form of contact making mechanism from that shown in any of the preceding figures, is employed, and Fig. 10 shows in a view similar to Fig. 1 and to an enlarged scale, a portion of a reel similar to that shown in Fig. 9, provided with a modified form of contact making mechanism from that shown in Fig. 9, actuated by operating mechanism similar to that illustrated in Fig. 9.

Similar numerals refer to similar parts throughout the several views.

As shown in Figs. 1 and 2 my device consists of a casing 10, made preferably from sheet metal having opposite side walls 10ª, 10ᵇ separable from each other to facilitate assembling the device, the parts being held together by suitable screws as indicated. The cylindrical surface of the casing 10 has projecting therefrom, as indicated in Fig. 2 and preferably tangentially to the said cylindrical surface, a tube 11, through which electric conductors 12 and 13 extend to an electrically operated device 14, which may be a cigar lighter, or any device adapted for electric operation which it is desired to move to various distances from the casing 10 when the electric device is in operation.

The casing 10 contains a shaft 15, preferably of molded insulation, provided with a bore 16 in which a nut 17 is disposed so that it may move freely in said bore axially of the shaft, but be restrained from rotary movement in the shaft in any suitable manner, for example, by providing said bore and said nut with similar and co-operating flat surfaces. The side wall 10ª of the casing has extending therethrough and insulated therefrom, a screw 18 held in place by a clamping nut 19, said screw being provided with a collar 20 on the inside of the casing to hold the screw securely to the casing. The inner end of the screw 18 is provided with left hand threads as indicated at 21 to engage the threads in the nut 17 and at its extreme left hand end the screw 18 is provided with a portion 22 of reduced diameter forming a bearing support for the screw in a corresponding opening formed therefor in the material of the shaft. The right hand end of the screw 18 is provided with a binding screw 24 for securing one wire from the source of current supply to said screw 18. The other conductor from said source of supply is connected to the casing 10 by means of a second binding post 25 in electrical contact with the casing as indicated.

The insulating material adjacent the collar 20 engages a metallic collar 26 to hold it in clamping engagement between the insulating material and the side wall 10ª so that the outer cylindrical surface of the collar 26 may form one bearing for the shaft 15. This bearing surface is engaged by the inner surface of a sleeve 27 secured in a suitable counter bore therefor in the end of the shaft 15 so that it rotates with said shaft. The shaft 15 carries a contact making mechanism 28 extending radially through the shaft and insulated thereby from the metal parts of the device, the inner end of this mechanism being shown in section to illustrate the plunger contact 29 held by a suitable spring so as to extend slightly into the bore 16 in the path of the nut 17.

The shaft 15 has projecting therefrom a cylindrical flange 30 engaged on opposite sides by the two members 31 and 32 of the reel, these members being made preferably from stamped sheet metal to tightly clamp said flange between them, to form the web of the reel, and at their outer edges to form the groove portion of the reel. The parts 31 and 32 may be conveniently held together by riveted or bent lugs 33 formed from one of said parts for example the part 32 and extending through the other of said parts as indicated.

The part 32 of the reel is purposely formed as indicated to provide a side recess in the reel in which a spiral spring 34 is contained, the outer end of said spring being secured to the reel by means of a screw or bolt 35 which also forms a convenient fastening device for holding the inner end of one of the conductors 12 in electrical contact with the reel and spring. The part 32 of the reel is provided with a central tubular extension or sleeve 36 fitting the adjacent cylindrical portion of the shaft 15 to form one of its bearing surfaces. The side member 10ᵇ of the casing supports a cylindrical member 37 provided at its inner end with a counterbore so that it may extend over the end of the shaft 15 into the reel recess containing the spring 34 and the inner end of said spring is secured to said cylindrical extension as indicated. The counterbore in the member 37 is of a diameter forming a sliding fit with the outer surface of the sleeve 36 thus supporting the left hand end of the shaft 15. The casing member 10ᵇ is offset at its central portion as indicated at 38 to form a tubular support for the member 37, holding it in axial alignment with the shaft 15, but permitting rotary movement of said member in said tubular support. The outer end of the member 37 extends through the casing member 10ᵇ to engage the lever 39 mounted thereon, which lever is held in place on said extension by a clamping screw 40 and washer 41 as indicated, a shoulder portion being provided on said extension engaging the inwardly flanged outer end of the tube 38 to prevent axial movement of the member 37 in the casing. As indicated in Fig. 3 the opening in the lever 39 provided to engage the end of the extension 37 is flat sided as indicated at 39ª to prevent relative rotation between said lever and said extension. As a result, rotary movement of said lever, rotates said extension 37 and thus changes the tension on the spring 34 as desired. To provide a convenient means for holding the lever 39 in desired adjustment, I form from the side wall 10ᵇ of the casing, a hook shaped stop 42 in the path of said lever which, under the action of the spring 34, engages one edge of the lever to hold it not only against rotary movement, but also to prevent its movement away from the side member 10ᵇ of the casing. As a result of this construction, when it is desired to change the tension on the spring 34, the lever 39 is first moved angularly in a direction to increase the tension on the spring sufficiently to disengage the lever from the stop 42, then, if it is desired to increase the tension on the spring, motion of the lever is continued until the spring has the desired tension, and the lever is again permitted to engage the stop 42 as shown; on the other hand if it is desired to reduce the tension of the spring, the lever, which is preferably of metal having sufficient spring action to permit it, is moved from the side member 10ᵇ sufficiently to clear the stop 42 and rotated in a counterclockwise direction for the relation of the parts shown in Fig. 2, until the tension on the spring is reduced to the desired amount, and the lever is then permitted to engage the stop 42 as shown.

The inner end of the other electric conductor 13 passes through a suitable opening therefor in the reel and is secured to the contact mechanism 28 by a suitable binding screw. As a result of the construction described when the nut 17 is moved to the right on the shaft 15 for the relation of the parts shown in Fig. 1, until said nut is in engagement with the spring contact 29, electrical connection is established between the screw 18 and the conductor 13 and thus current is caused to flow through the electric conductors and the actuated device 14. The nut 17 and spring contact 29 are preferably so adjusted that when the conductors 12 and 13 are nearly wound on the reel the nut is just out of engagement with said spring contact, thus affording sufficient separation between the nut and the spring contact to insure the device against current flow when the conductors are wholly wound on the reel, also that when the conductors are slightly unwound from the reel the nut 17 is moved into engagement with the contact 29 and that further movement of the conductors from the reel, moves the nut 17 under the contact 29 and still in electrical engagement with it, which condition continues for any amount of the conductors subsequently unwound from the reel. In this way I provide a means for insuring current flow through the conductors and the electrically operated device for any condition of the conductors on the reel excepting when said conductors are nearly or wholly wound upon the reel and thus I facilitate using the electrically operated device at any desired distance from the casing.

It will be observed that all of the movable parts involved in controlling the contact mechanism, are contained within the shaft of the device and that by making the shaft of molded insulating material, the shaft may not only be readily constructed to facilitate mounting the contact making mechanism, but also to facilitate securing the other rotary parts to the shaft as described. It will also be observed that as a result of mounting the spring within the reel, the device may be made compact and of little more bulk than required to take care of the electric conductors wound on the reel, and further that the metal parts may conveniently be made by simple punching and stamping operations.

The construction shown in Fig. 4 is similar to that illustrated in Fig. 1 excepting that the shaft 15ᵃ is extended radially to form the web and flange member 31ᵃ of the reel, the other side member 32ᵃ of said reel being formed preferably from a metal stamping having lugs or ears 33ᵃ extending through the web 31ᵃ to hold the parts together. In this case the sleeve 36ᵃ is separate from the reel member 32ᵃ but is carried by the shaft in the same manner and serves the same purpose as the sleeve 36 described in connection with the construction shown in Fig. 1. In the construction of Fig. 4 the sleeve 27ᵃ is carried on the outer surface of the shaft 15ᵃ, instead of in a bore therein as illustrated for the sleeve 27 in Fig. 1, and a suitable bearing surface is provided for this sleeve 27ᵃ, by forming a tubular member 43 on the side member of the casing, having a sliding fit with the outer surface of the sleeve 27ᵃ. In other respects the construction shown in Fig. 4 is the same as that illustrated in Fig. 1 and operates in the same manner to secure the same results.

The construction illustrated in Fig. 5 differs from that shown in Figs. 1 and 4 in that the insulating material of the shaft 15ᵇ is extended to form the entire groove portion of the reel. In this case, inasmuch as the entire reel is of insulating material the contact mechanism 28ᵇ is conveniently in the form of a conducting rod extending through the web of the reel with a socket at its outer end to receive the end of one of the electric conductors, a clamping screw 28ᶜ being provided to hold the end of said conductor in place. The inner end of the rod 28ᵇ contains a spring contact 29ᵇ similar to the spring contact 29 and similarly disposed excepting that in this case the nut 17ᵇ is to the right of the spring contact when the circuit through the device is open instead of to the left of the contact as shown in Figs. 1 and 4. In this case the screw 18ᵇ is provided with right hand threads, the nut and screw being otherwise similar to the corresponding devices shown and described in connection with Figs. 1 and 4 and operating in the same manner to secure the same result excepting as to the direction of motion of the nut 17 when the conductors are unwound from the reel. In this construction, the bearing sleeve 27ᵇ is provided with an inturned flange on its outer end engaging a shoulder 44 on the side member of the casing instead of engaging the material insulating the screw 18ᵇ from the casing. In this manner any thrust of the shaft 15ᵇ is prevented from wearing the material insulating the screw 18ᵇ. In this construction, since the reel is entirely of insulating material, a cup 45, preferably of sheet metal, fitting the side recess in the reel, is forced therein to engage and take the thrust of the spring 34 through the clamping screw or bolt 35. The cup 45 is continued at its inner edge into an outwardly extending tube forming a bearing sleeve 36$^b$, supported and operating in the same manner and for the same purpose as described above for the sleeves 36 and 36$^a$.

To insure against possible rotation of the cup 45 in the reel, I provide the cup at intervals, as indicated in Fig. 8, with outwardly extending keys 46 engaging similar keyways formed in the shaft and reel structure 15$^b$, as a result of which the cup may be inserted in the recess in the reel without undue pressure and with the certainty that it cannot move angularly in the reel, and thus that the tension of the spring 34 communicated to the cup will be effectively communicated to the reel without undue wear or danger of breaking the material of the reel.

In the construction shown in Fig. 6, the shaft and reel 15$^c$ are of similar construction to the corresponding parts shown in Fig. 5, the principal differences being that the sleeve 27$^c$ is provided with an extension embedded in the material of the shaft 15$^c$ and that the bearing sleeve 36$^c$ is also provided with an extension similarly embedded in the material of said shaft. In this construction the conducting rod 28$^d$ is located to avoid possible contact with the sleeve extensions embedded in the shaft and is provided with an end clamping screw 28$^e$ as indicated. In this construction the bearing sleeve 27$^c$ extends beyond the end of the shaft to receive within it the tubular bearing surface 46 provided on the side member of the casing to constitute one of the bearing surfaces of the shaft and this extended portion of the sleeve 27$^c$ also contains the parts of the screw 18$^c$ effective in clamping said screw to the side wall of the casing. In other respects the construction is substantially the same and operates in the same manner and produces the same results as the construction shown in Fig. 5.

In the construction shown in Fig. 7, the shaft and reel construction 15$^d$ is substantially the same as shown and described in connection with Fig. 5, the principal difference being that the shaft is shorter than that shown in Fig. 5. In Fig. 7, the bore of the shaft contains the head 47 of a screw 18$^d$ provided with left hand threads to engage corresponding threads in a nut 48 rigidly secured in a tubular extension 49 projecting to the right from the casing 10$^d$ of the device. In this construction the spring contact 29$^d$ is in sliding, electrical contact at all times with the head 47 of the screw 18$^d$. The tubular extension 49 is inwardly flanged at its outer end to support a spring contact device 50 in axial alignment with said screw. Suitable insulating material is interposed between the contact mechanism 50 and the flanged end of the extension 49 and the outer end of the mechanism 50 is provided with a binding screw 51 for receiving one of the wires from the source of electric supply. The inner end of the mechanism 50 is provided with a spring contact 52 engaged by the end of the screw 18$^d$ when the conductors are but partly removed from the reel, the motion of the contact 52 being sufficient to permit as many rotations of the reel as may be required to wholly remove the conductors therefrom, after the initial unwinding movement of the reel has established electrical connection between the contact 52 and the screw 18$^d$. In other respects the construction illustrated in Fig. 7 is similar to and operates in substantially the same manner to secure the same results as that described in connection with Figs. 5 and 6.

In the construction shown in Fig. 9, the shaft and reel construction 15$^e$ is similar to that shown and described in connection with Figs. 5 and 7, the difference being the form of contact mechanism employed. In this construction a screw 18$^e$ is supported in the bore of the shaft from the casing in substantially the manner shown in Fig. 4 and the bore of the shaft contains a nut 17$^e$ having right hand threads engaging similar threads on the screw 18$^e$ in the same manner above described, the only difference from the construction shown in Fig. 4 being the direction in which the nut and screw are threaded. In this construction the nut 17$^e$ is provided with a peripheral groove engaging the lower end of a contact member 52' pivotally supported at 53 in a suitable clearance therefor in the shaft construction so that the upper end of said member 52' is in line with a spring contact 54 secured to the web of the shaft and reel construction. A fixed stop 55 extends from the shaft and reel construction in line with the contact 54 to limit its movement to the left for the relation of parts shown in Fig. 9. The parts described are so related that when the reel is in a position completely winding the conductors thereon, the upper end of the member 52' is in its extreme left hand position, sufficiently removed from the spring contact 54 to insure interruption of the electric circuit through the conductors. Initial unwinding movement of the conductors moves the member 52' into engagement with the spring contact 54 and continued motion of the reel in its unwinding direction moves the spring contact 54 further from its back stop 55 thus maintaining the closure of the circuit through the conductors for all conditions of unwinding of the conductors. A conducting strip 56 extends from the spring contact 54 to the groove portion of the reel where it is engaged by a clamping screw 57 to receive the inner end of one of the conductors wound on the reel. In other respects the construction is similar to and operates in the same manner to produce the same results as the constructions above described.

In Fig. 10 I show a modified contact mechanism for operation by an actuating mechanism of a construction similar to that shown in Fig. 9. In this case a member 52ª is pivotally supported at 53ª in a suitable clearance provided for said member in the shaft and reel construction 15ᶠ. The screw and nut operating mechanism shown in Fig. 9 are employed to operate the member 52ª, the only difference being that the screw and nut are provided with left hand threads instead of right hand threads as shown in Fig. 9. In the construction shown in Fig. 10, movement to the left of the upper end of the member 52ª engages a spring contact 58 carried by the reel construction 15ᶠ, a clamping screw 59 extending through the reel construction from its groove portion to the housing of said spring contact to make electrical connection with the inner end of one of the conductors wound on the reel. The relation of the parts is such that when the conductors are fully wound on the reel the member 52ª occupies a position relatively to the contact 58 substantially as shown in Fig. 10, positively opening the circuit through the electric conductors on the reel. When the reel begins its unwinding movement, the member 52ª is moved into engagement with the contact 58 closing the circuit to the conductors on the reel and this condition is continued during the entire unwinding operation, the possible movement of the spring contact 58 being purposely made sufficient to permit the member 52ª to move to the left the full amount of its motion corresponding to the number of rotations of the reel required to entirely unwind the conductors therefrom. In other respects the reel, actuating spring, casing, screw and operating nut may be the same as shown and described in connection with Fig. 9.

While I have shown my invention in the particular embodiments above described, it will be understood that I do not limit myself to this exact construction as I may employ equivalents known to the art at the time of the filing of this application without departing from the scope of the appended claims.

What I claim is:

1. In a reel for electric conductors, the combination of a support, a hollow shaft mounted for rotary movement on said support, a reel carried by said shaft, a fixed threaded member carried by said support, a second threaded member rotary with and movable longitudinally of said shaft and engaging said fixed member, and an electric contact carried by said shaft to control the circuit through conductors on said reel by movement of said second member relatively to said shaft.

2. In a reel for electric conductors, the combination of a support, a hollow shaft mounted for rotary movement on said support, a reel carried by said shaft, a fixed threaded member carried by said support, a second threaded member rotary with and movable longitudinally of said shaft and engaging said fixed member, and an electric contact carried by said shaft to control the circuit through conductors on said reel by movement of said second member relatively to said shaft, said second member being contained within said shaft, and having flat sided engagement therewith, and said contact projecting into the path of said second member.

3. In a reel for electric conductors, the combination of a support, a hollow shaft mounted for rotary movement on said support, a reel carried by said shaft, a fixed threaded member carried by said support, a second threaded member rotary with and movable longitudinally of said shaft and engaging said fixed member, and an electric contact carried by said shaft to control the circuit through conductors on said reel by movement of said second member relatively to said shaft, said second member being contained within said shaft and having flat sided engagement therewith, and said contact projecting into the path of said second member, said shaft being of insulating material insulating said second member and said contact and said fixed member being insulated from said support.

4. In a reel for electric conductors, the combination of a support, a hollow shaft mounted for rotary movement on said support, a reel carried by said shaft, a fixed threaded member carried by said support, a second threaded member rotary with and movable longitudinally of said shaft and engaging said fixed member, and an electric contact carried by said shaft to control the circuit through conductors on said reel by movement of said second member relatively to said shaft, said contact having yielding engagement with its actuating device permitting a plurality of rotations of said reel with said contact in its actuated condition.

5. In a reel for electric conductors, the combination of a support, a hollow shaft mounted for rotary movement on said support, a reel carried by said shaft, a fixed threaded member carried by said support, a second threaded member rotary with and movable longitudinally of said shaft and engaging said fixed member, an electric contact carried by said shaft to control the circuit through conductors on said reel by movement of said second member relatively to said shaft, said shaft being of insulating material, and metal sleeves carried by said shaft to engage bearings therefor on said support.

6. In a reel for electric conductors, the combination of a support, a hollow shaft mounted for rotary movement on said support, a reel carried by said shaft, a fixed threaded member carried by said support, a second threaded member rotary with and movable longitudinally of said shaft and engaging said fixed member, an electric contact carried by said shaft to control the circuit through conductors on said reel by movement of said second member relatively to said shaft, said shaft being of molded insulating material, and metal sleeves carried by said shaft forming its bearing surfaces, said shaft having an outwardly extending circular flange, and said reel comprising sheet metal stampings held together in clamping engagement with said flange.

7. In a reel for electric conductors, the combination of a support, a hollow shaft mounted for rotary movement on said support, a reel carried by said shaft, a fixed threaded member carried by said support, a second threaded member rotary with and movable longitudinally of said shaft and engaging said fixed member, an electric contact carried by said shaft to control the circuit through conductors on said reel by movement of said second member relatively to said shaft, said shaft being of molded insulating material, metal sleeves carried by said shaft forming its bearing surfaces, said shaft having an outwardly extending circular flange, and said reel comprising sheet metal stampings held together in clamping engagement with said flange, one of said stampings forming a spring housing, and a reel driving spring in said housing having one of its ends secured thereto.

8. In a reel for electric conductors, the combination of a support, a hollow shaft mounted for rotary movement on said support, a reel carried by said shaft, a fixed threaded member carried by said support, a second threaded member rotary with and movable longitudinally of said shaft and engaging said fixed member, an electric contact carried by said shaft to control the circuit through conductors on said reel by movement of said second member relatively to said shaft, said shaft being of molded insulating material, metal sleeves carried by said shaft forming its bearing surfaces, said shaft having an outwardly extending circular flange, and said reel comprising sheet metal stampings held together in clamping engagement with said flange, one of said stampings forming a spring housing, a reel driving spring in said housing having one of its ends secured thereto, and an extension from said support into said housing secured to the other end of said spring, said extension forming a bearing for one end of said shaft.

9. In a reel for electric conductors, the combination of a support, a hollow shaft mounted for rotary movement on said support, a reel carried by said shaft, a fixed threaded member carried by said support, a second threaded member rotary with and movable longitudinally of said shaft and engaging said fixed member, an electric contact carried by said shaft to control the circuit through conductors on said reel by movement of said second member relatively to said shaft, said shaft being of molded insulating material, metal sleeves carried by said shaft forming its bearing surfaces, said shaft having an outwardly extending circular flange, and said reel comprising sheet metal stampings held together in clamping engagement with said flange, one of said stampings forming a spring housing, a reel driving spring in said housing having one of its ends secured thereto, an extension from said support into said housing secured to the other end of said spring, and a lever rotary relatively to said support and secured to said extension to change the tension on said spring as desired.

10. In a reel for electric conductors, the combination of a support, a hollow shaft mounted for rotary movement on said support, a reel carried by said shaft, a fixed threaded member carried by said support, a second threaded member rotary with and movable longitudinally of said shaft and engaging said fixed member, an electric contact carried by said shaft to control the circuit through conductors on said reel by movement of said second member relatively to said shaft, said shaft being of molded insulating material, metal sleeves carried by said shaft forming its bearing surfaces, said shaft having an outwardly extending circular flange, and said reel comprising sheet metal stampings held together in clamping engagement with said flange, one of said stampings forming a spring housing, a reel driving spring in said housing having one of its ends secured thereto, an extension from said support into said housing secured to the other end of said spring, a lever rotary relatively to said support and secured to said extension to change the tension on said spring as desired, and a retaining stop on said support preventing back rotation of said lever, said lever being of spring material permitting its movement over said stop in adjusting said spring tension.

11. The combination with a rotatable reel, of a conductor wound thereon, a terminal connected to one end of the conductor, a stationary circuit terminal spaced from the conductor terminal transversely of the reel, a switching member threaded on one of the terminals on an axis identical with that of the reel and extending transversely of the reel toward the other terminal, the other terminal having a contact face adapted to be engaged by the switching member; and means fast with respect to the said other terminal and engaging the switching member whereby a rotation of the reel rotates the switching member so as to cause the switching member to move towards or away from the said contact face.

12. The combination with a rotatable reel, of a conductor wound thereon, a terminal connected to one end of the conductor, a stationary circuit terminal spaced from the conductor terminal axially of the reel, a switching member threaded on one of the terminals on an axis having substantially the same direction as that of the reel and extending toward the other terminal, the other terminal having a contact face adapted to be engaged by the switching member; and means fast with respect to the said other terminal and engaging the switching member whereby a rotation of the reel rotates the switching member so as to cause the switching member to move towards or away from the said contact face.

In witness whereof, I hereunto subscribe my name this 17th day of October, A. D. 1924.

ALBERT E. F. MOONE.